US009324243B2

United States Patent
Soejima

(10) Patent No.: US 9,324,243 B2
(45) Date of Patent: Apr. 26, 2016

(54) MUSICAL SCORE PERFORMING APPARATUS, A METHOD OF PERFORMING A MUSICAL SCORE, AND A PROGRAM RECORDING MEDIUM

(71) Applicant: CASIO COMPUTER CO., LTD., Shibuya-ku, Tokyo (JP)

(72) Inventor: Junichiro Soejima, Akishima (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 92 days.

(21) Appl. No.: 14/223,799

(22) Filed: Mar. 24, 2014

(65) Prior Publication Data

US 2014/0283668 A1    Sep. 25, 2014

(30) Foreign Application Priority Data

Mar. 25, 2013    (JP) .................................. 2013-062026

(51) Int. Cl.
G09B 15/00    (2006.01)
(52) U.S. Cl.
CPC .................................... *G09B 15/002* (2013.01)
(58) Field of Classification Search
CPC .................................................... G09B 15/002
USPC ......................................................... 84/477 R
See application file for complete search history.

(56) References Cited

U.S. PATENT DOCUMENTS

| 8,536,437 | B2 | 9/2013 | Katsuta |
| 8,744,136 | B2 | 6/2014 | Katsuta |
| 2012/0139935 | A1* | 6/2012 | Miyasaka et al. ............. 345/589 |
| 2012/0247305 | A1* | 10/2012 | Katsuta ...................... 84/477 R |
| 2012/0250941 | A1 | 10/2012 | Katsuta |

FOREIGN PATENT DOCUMENTS

| JP | 06308951 A | 11/1994 |
| JP | 07191668 A | 7/1995 |
| JP | 2012-215630 A | 11/2012 |
| JP | 2012215960 A | 11/2012 |

OTHER PUBLICATIONS

Japanese Office Action (and English translation thereof) dated Jun. 30, 2015, issued in counterpart Japanese Application No. 2013-062026.

* cited by examiner

*Primary Examiner* — Jianchun Qin
(74) *Attorney, Agent, or Firm* — Holtz, Holtz & Volek PC

(57) ABSTRACT

A musical-score performing apparatus is provided. In the apparatus, a musical-score displaying unit with a displaying screen displays a musical score of music on the displaying screen, the musical score being represented by a form of multiple staffs, and a designating unit is used to designate a position on the displaying screen of the musical-score displaying unit. A play-back controlling unit plays back the music represented by apart or the whole of the multiple staffs of the musical score in accordance with the position designated on the displaying screen.

8 Claims, 16 Drawing Sheets

FIG.3

| scoreCtrl | nowPage | (PAGE ON DISPLAY) |
| --- | --- | --- |
| | TimeLast | (TIME WHEN LAST INSTRUCTION HAS BEEN GIVEN) |
| | scrX | (STARTING COORDINATE ON X-AXIS ON SCREEN) |
| | scrY | (STARTING COORDINATE ON Y-AXIS ON SCREEN) |
| | scrSX | (DISPLAYING WIDTH ON SCREEN) |
| | scrSY | (DISPLAYING HEIGHT ON SCREEN) |
| | Page Count | (NUMBER OF PAGES) |
| | Bitmap[PageCount] | (IMAGE DATA OF EACH PAGE) |
| | Scale | (SCALE FACTOR) |
| | x | (STARTING COORDINATE ON X-AXIS IN ORIGINAL IMAGE) |
| | y | (STARTING COORDINATE ON Y-AXIS IN ORIGINAL IMAGE) |
| | SX | (DISPLAYING WIDTH ON X-AXIS IN ORIGINAL IMAGE) |
| | SY | (DISPLAYING HEIGHT ON Y-AXIS IN ORIGINAL IMAGE) |

FIG.4

| Bitmap[0] | Bmp | (IMAGE DATA) |
| --- | --- | --- |
| | width | (WIDTH) |
| | height | (HEIGHT) |
| Bitmap[1] | | |
| | | |
| | | |
| | ... | |
| Bitmap[N] | | |
| | | |
| | | |
| | ... | |

FIG.5

| | | |
|---|---|---|
| Meas[0] | Page | (THE NUMBER OF THE PAGE) |
| | Rect | (4 COORDINATES IN A MEASURE IN ORIGINAL IMAGE) |
| | Shelf | (THE NUMBER OF THE SHELF) |
| | TopR | (TOP-RIGHT COORDINATE OF STAFF IN ORIGINAL IMAGE) |
| | BottomR | (BOTTOM-RIGHT COORDINATE OF STAFF IN ORIGINAL IMAGE) |
| | TopL | (TOP-LEFT COORDINATE OF STAFF IN ORIGINAL IMAGE) |
| | BottomL | (BOTTOM-LEFT COORDINATE OF STAFF IN ORIGINAL IMAGE) |
| | time | (LEADING TIME OF MEASURE) |
| | gate | (A DURATION OF MEASURE) |
| Meas[1] | | |
| | ... | |
| Meas[N] | | |
| | ... | |

FIG.6

| Note[0] | Time | (TIME OF STARTING TONE GENERATION) |
| --- | --- | --- |
| | Gate | (SOUNDING DURATION) |
| | Pitch | (PITCH) |
| | Track | (TRACK NUMBER (1: FOR RIGHT HAND, 2: FOR LEFT HAND)) |
| | Meas | (THE NUMBER OF THE MEASURE) |
| | x | (X-COORDINATE OF NOTE HEAD IN ORIGINAL IMAGE) |
| | y | (Y-COORDINATE OF NOTE HEAD IN ORIGINAL IMAGE) |
| Note[1] | | |
| | ... | |
| Note[N] | | |
| | ... | |

MUSICAL SCORE PERFORMING APPARATUS, A METHOD OF PERFORMING A MUSICAL SCORE, AND A PROGRAM RECORDING MEDIUM

CROSS-REFERENCE TO RELATED APPLICATION

The present application is based upon and claims the benefit of priority from the prior Japanese Patent Application No. 2013-062026, filed Mar. 25, 2013, the entire contents of which are incorporated herein by reference.

BACKGROUND OF THE INVENTION

1. Field of the Invention

The present invention relates to a musical score performing apparatus for performing a musical score displayed on a displaying screen, a method of performing a musical score, and a program recording medium.

2. Description of the Related Art

Until now, musical-score performing apparatuses provided with a displaying screen of a touch panel type are known, in which, when a user touches a position in a musical score displayed on the displaying screen, the musical score is performed from the touched position (for instance, refer to Japanese Unexamined Patent Publication No. 2012-215630).

In the apparatus disclosed in Japanese Unexamined Patent Publication No. 2012-215630, when the user touches a performance pointer to move the same pointer on the score displayed on the displaying screen, musical notes on the score are played at timings corresponding to the movement of the performance pointer. In general, music is written in a form of multiple staves or staffs of musical score.

For example, it is general that piano music is written in two staffs, one for the right-hand part and the other for the left-hand part. In musical scores for an orchestra and ensemble and band-scores, the musical score is written in multiple staffs respectively for musical instruments. But the technology proposed by Japanese Unexamined Patent Publication No. 2012-215630 has not taught the user how to read and/or practice the score, while confirming in what manner the score for right-hand part is performed or in what tone one of musical instruments is played.

SUMMARY OF THE INVENTION

The present invention has been made in consideration of the above conventional instruments and provides a musical score performing apparatus, a method of performing a musical score, and a program recording medium, for playing back a part or the entire of a musical score which is represented in a form of multiple staffs and displayed on a displaying screen, when a user executes a simple operation thereon.

According one aspect of the invention, there is provided a musical-score performing apparatus which comprises a musical-score displaying unit having a displaying screen, which unit displays a musical score of music on the displaying screen, the music score being represented in a form of multiple staffs, a designating unit which is used to designate a position on the displaying screen of the musical-score displaying unit, and a play-back controlling unit which plays back the music represented by a part or the whole of the multiple staffs of the musical score in accordance with the position designated by the designating unit.

According to the present invention, the musical score represented in the form of multiple staffs and displayed on the displaying screen can be played back partially or in whole.

BRIEF DESCRIPTION OF THE DRAWINGS

FIG. 3 is a view showing controlling variables concerning a displaying screen in the performance system according to the embodiment of the invention.

FIG. 4 is a view showing controlling variables concerning a musical-score image in the performance system according to the embodiment of the invention.

FIG. 5 is a view showing a configuration of measure information in the performance system according to the embodiment of the invention.

FIG. 6 is a view showing a configuration of performance information in the performance system according to the embodiment of the invention.

DETAILED DESCRIPTION OF THE PREFERRED EMBODIMENTS

Now, the preferred embodiments of the present invention will be described with reference to the accompanying drawings in detail.

Figure 1:
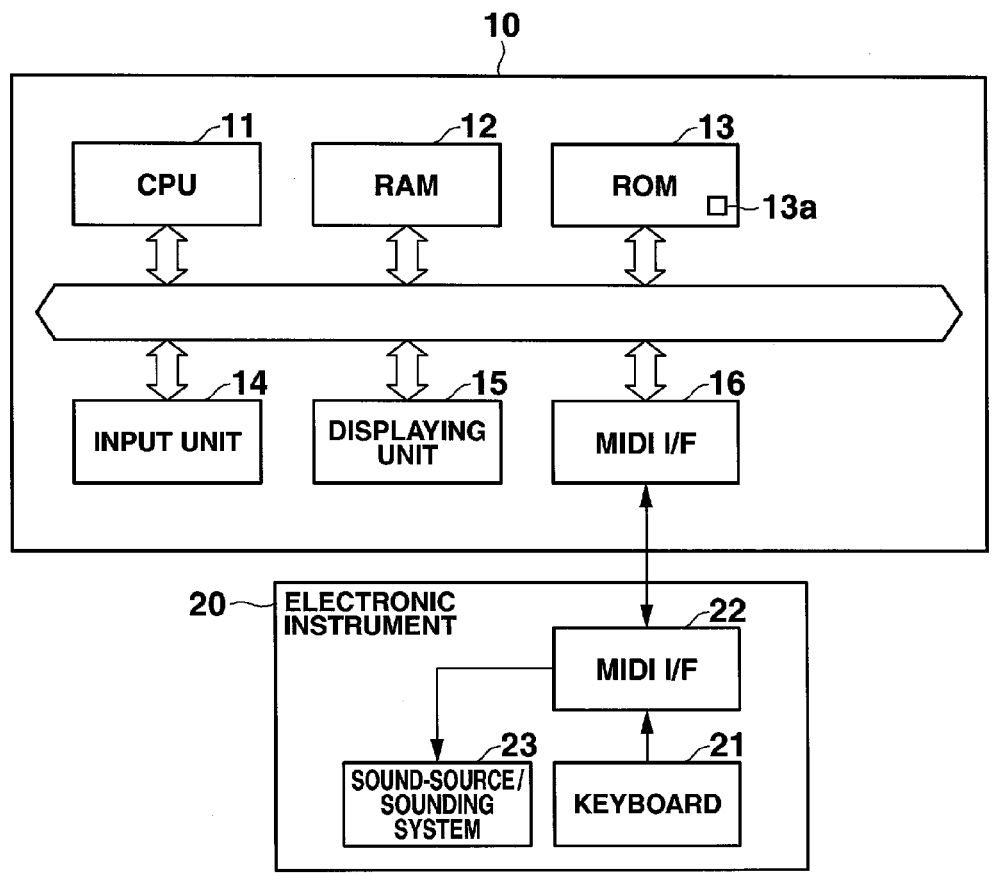
FIG. 1 is a block diagram showing a circuit configuration of a performance system according to one embodiment of the invention.

FIG. 1 is a block diagram showing a circuit configuration of a performance system according to one embodiment of the invention.

The performance system is composed of a personal computer (PC) 10 and an electronic musical instrument 20. The PC 10 is used as a musical score performing apparatus of the present invention. The PC 10 comprises CPU (main controlling unit) 11, and RAM 12, ROM 13, an input unit 14, a displaying unit 15 and MIDI interface (I/F) 16, all of which are connected to CPU 11.

CPU 11 runs various sorts of programs 12a recorded in ROM 12 to perform various processes in accordance with events entered from the input unit 14. In the present embodiment of the invention, CPU 11 is provided with various sorts of functions for realizing the musical score performing apparatus of the invention (refer to FIG. 2).

Various sorts of data which CPU 11 needs to perform the processes is store in RAM 12. In RAM 12, image data of musical scores and performance information to be described later are stored. In ROM 13, the various sorts of programs 12a are recorded. A program for controlling a musical-score performance of the present invention is included in the programs 12a.

The input unit 14 comprises an input device such as a keyboard and a mouse. The input unit 14 generates an event in response to a user's input operation executed thereon and supplies the event to CPU 11. The displaying unit 15 consists of a color displaying device such as LCD (Liquid Crystal Display) and has a displaying screen of a predetermined size. In the present embodiment of the invention, it is supposed that a touch panel is used as the input unit 14 and this touch panel is provided on the displaying screen of the displaying unit 15 to cover the whole upper surface of the displaying screen. MIDI interface 16 cooperates with the electronic musical instrument 20 in conformity with MIDI (Musical Instrument Digital Interface) standards to perform a signal input/output process.

An electronic piano is used as the electronic musical instrument 20. The electronic musical instrument 20 is provided with a keyboard 21 having keys covering a given number of pitches, MIDI interface 22 for performing a signal input/output process to cooperate with the electronic musical instrument 20, and a sound-source•sounding system 23 for generating various musical tones.

Figure 2:
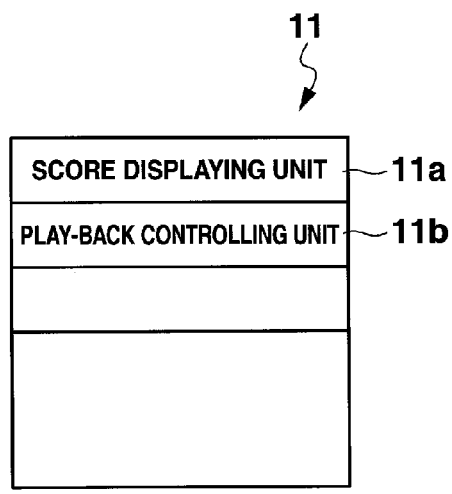
FIG. 2 is a block diagram showing a configuration of functions of CPU provided in PC of the performance system according to the embodiment of the invention.

FIG. 2 is a block diagram showing a configuration of functions of CPU 11. CPU 11 has a score displaying unit 11a and a play-back controlling unit 11b as a functional configuration concerning the musical score performing apparatus.

The score displaying unit 11a is for displaying a musical score composed of multiple staffs representing a given music on the displaying screen of the displaying unit 15. When an arbitrary position on the displaying screen is designated, the play-back controlling unit 11b plays back music represented by a portion or the whole of the multiple staffs of musical score in accordance with the designated position.

In the performance system having the configuration described above, image data of the score stored in RAM 12 and the like is displayed on the displaying screen of the displaying unit 15. When a user touches and designates an arbitrary position on the displaying screen of the displaying unit 15, a musical note on the score corresponding to the designated position is played back. The performance information of each musical note on the score is stored in RAM 12 and the like, and the performance information of the musical note corresponding to the designated position is read from RAM 12 and the like and played back.

FIG. 3 is a view showing controlling variables concerning the displaying screen of the displaying unit 15.

As shown in FIG. 3, the following variables are defined as the controlling variables concerning the displaying screen: "nowPage" (a page on display); "TimeLast" (a time at which the last instruction was given); "scrX" (a starting coordinate of displaying a score on the x-axis on the displaying screen); "scrY" (a starting coordinate of displaying the score on the y-axis on the displaying screen); "scrSX" (a score displaying width on the displaying screen); "scrSY" (a score displaying height on the displaying screen); "PageCount" (number of pages); "Bitmap[PageCount]" (image data of each page); "Scale" (a scale factor to an original image); "x" (a starting coordinate of displaying an image on the x-axis in the original-image); "y" (a starting coordinate of displaying the image on the y-axis in the original-image); "SX" (an image displaying width along the x-axis in the original-image); and "SY" (an image displaying width along the y-axis in the original-image). The data of these variables is stored, for example, in a displaying screen controlling area (not shown) of RAM 12.

FIG. 4 is a view showing controlling variables concerning a musical-score image.

As shown in FIG. 4, the following variables are defined as the controlling variables concerning the musical-score image: "Bmp" (image data); "width" (width); and "height" (height). The data of these variables is stored, for example, in a musical-score image controlling area (not shown) of RAM 12.

FIG. 5 is a view showing a configuration of measure information.

The data of a musical score is managed in unit of a measure. In FIG. 5, "Meas [N]" denotes the number of the measure. As shown in FIG. 5, the following variables are defined concerning each measure: "Page" (the number of the page); "Rect" (4 coordinates specifying a rectangle (or a measure) in the original image Left/Top/Right/Bottom); "Shelf" (the number of the shelf); "TopR" (a coordinate of the right part on the top line of the staff in the original image); "BottomR" (a coordinate of the right part on the bottom line of the staff in the original image); "TopL" (a coordinate of the left part on the top line of the staff in the original image); "BottomL" (a coordinate of the left part on the bottom line of the staff in the original image); "time" (a leading time of the measure); and "gate" (a duration of the measure). The data of these variables is stored, for example, in a measure controlling area (not shown) of RAM 12.

FIG. 6 is a view showing a configuration of performance information.

The performance information is used to generate tones of musical tones on the score, and managed in unit of a musical note. In FIG. 6, "Note[N]" denotes the number of the musical note. As shown in FIG. 6, the following variables are defined concerning each musical note: "Time" (a time at which a tone generation of a musical note starts); "Gate" (a sounding duration of a musical note); "Pitch" (a pitch); "Track" (the track number, 1: for right hand, 2: for left hand); "Meas" (the number of the measure); "x" (x-coordinate of a note head in the original image); and "y" (y-coordinate of the note head in the original image). The data of these variables is stored, for example, in a performance-information controlling area (not shown) of RAM 12.

Before describing the operation of the present performance system, taking a specific embodiment as an example for facilitating understanding of the system, a method of the invention for performing a musical score will be described.

Figure 7:
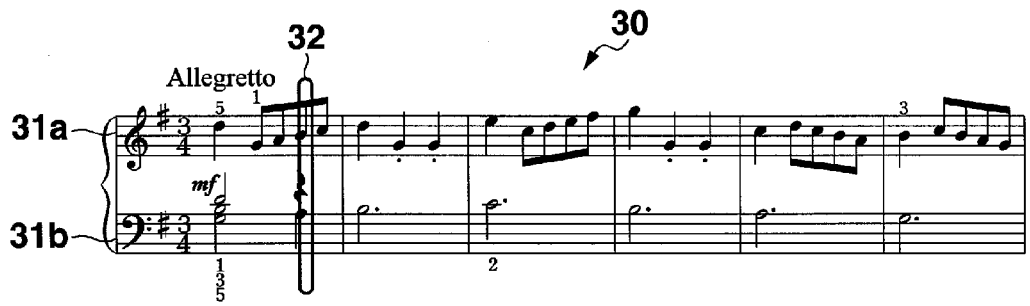
FIG. 7 is a view showing an example of a displaying screen of a score image in the performance system according to the embodiment of the invention.

FIG. 7 is a view showing an example of a score image displayed on the displaying screen of the displaying unit 15.

In FIG. 7, a reference numeral 30 denotes the score image. A reference numeral 31*a* denotes a staff on the top shelf and a reference numeral 31*b* denotes a staff on the bottom shelf in the score image 30. The staff 31*a* on the top shelf is one used to represent a piano (right-hand part) and the staff 31*b* on the bottom shelf is one used to represent a piano (left-hand part). A reference numeral 32 denotes a performance pointer that indicates the present position of performance. The performance pointer 32 is displayed on the score image 30 in an overlapping manner, as shown in FIG. 7.

The performance pointer 32 is placed so as to bisect the upper staff 31*a* and the lower staff 31*b* at right angles, and moves along with a progression of music performance in response to the user's touch operation and vice versa. The performance pointer 32 indicates the present played-back position in the score image 30.

When a position on the displaying screen is designated, apart or the entire part of music is played back in accordance with the designated position. The playing back states are displayed in FIG. 8 to FIG. 10.

Figure 8:
FIG. 8 is a view showing a score image displayed when the both parts are selected in the performance system according to the embodiment of the invention.
Figure 9:
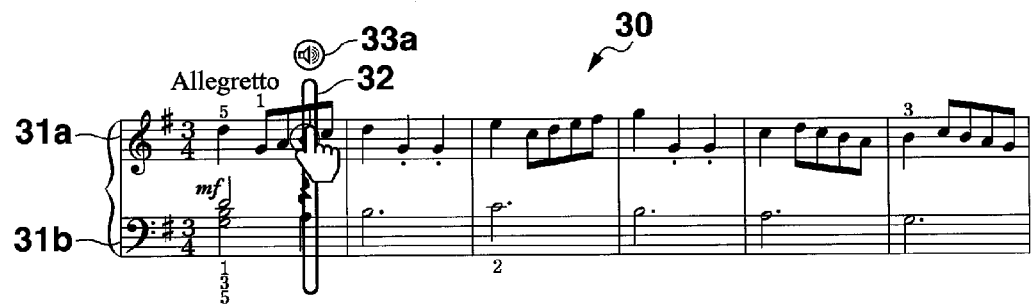
FIG. 9 is a view showing the score image displayed when the right-part is selected in the performance system according to the embodiment of the invention.
Figure 10:
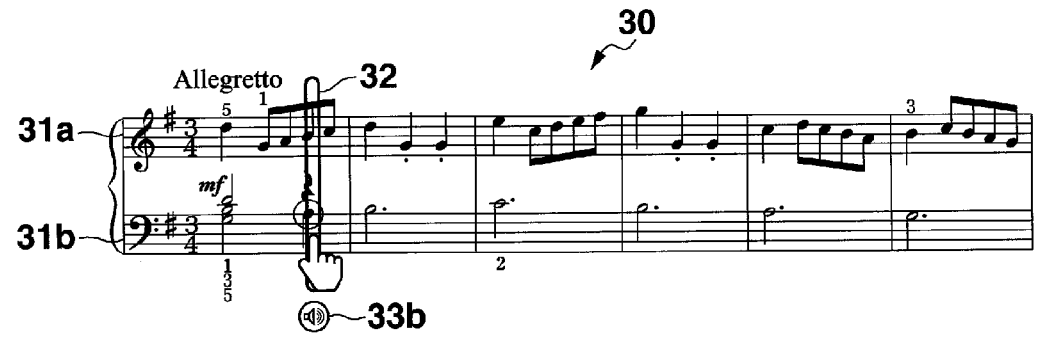
FIG. 10 is a view showing the score image displayed when the left-part is selected in the performance system according to the embodiment of the invention.

FIG. 8 is a view showing the score image displayed when the both parts are selected. FIG. 9 is a view showing the score image displayed when the right-part is selected. FIG. 10 is a view showing the score image displayed when the left-part is selected.

As shown in FIG. 8, when the user touches a space between the upper staff 31*a* and the lower staff 31*b* in the score image 30 displayed on the displaying screen with his/her finger, the both the upper staff 31*a* and the lower staff 31*b* are selected as ones to be played. Then, the performance pointer 32 moves to the position touched by the user, and a right-part tone on the upper staff 31*a* indicated by the performance pointer 32 and a left-part tone on the lower staff 31*b* indicated by the performance pointer 32 are played back simultaneously.

In FIG. 8, a reference numeral 33*a* denotes a sounding mark which represents that the performer is playing the score of the upper staff 31*a*, and a reference numeral 33*b* denotes a sounding mark which represents that the performer is playing the score of the lower staff 31*b*.

As shown in FIG. 9, when the user touches the upper staff 31*a* in the score image 30 displayed on the displaying screen with his/her finger, the upper staff 31*a* is selected as one to be played. Then, the performance pointer 32 moves to the position touched by the user, and only a right-part tone on the upper staff 31*a* indicated by the performance pointer 32 is played back.

As shown in FIG. 10, when the user touches the lower staff 31*b* in the score image 30 displayed on the displaying screen with his/her finger, the lower staff 31*b* is selected as one to be played. Then, the performance pointer 32 moves to the position touched by the user, and only a left-part tone on the lower staff 31*b* indicated by the performance pointer 32 is played back.

As described above, it is possible to play back the entire part of the score or the right-part or left-part of the score simply by moving the tone designating position on the displaying screen, whereby musical tones on the score can be played-back separately. Therefore, the present technique is conveniently used by the player in practicing the instruments while confirming the musical tones on multiple staffs of musical score.

The operation of the performance system will be divided into the following three processes to describe in detail: (a) a main process; (b) a musical-score image displaying process; and (c) a play-back process. The processes to be performed in accordance with flow charts are performed by CPU 11 provided in PC 10, when said CPU 11 runs the programs recorded in ROM 13.

(a) Main Process

Figure 11:
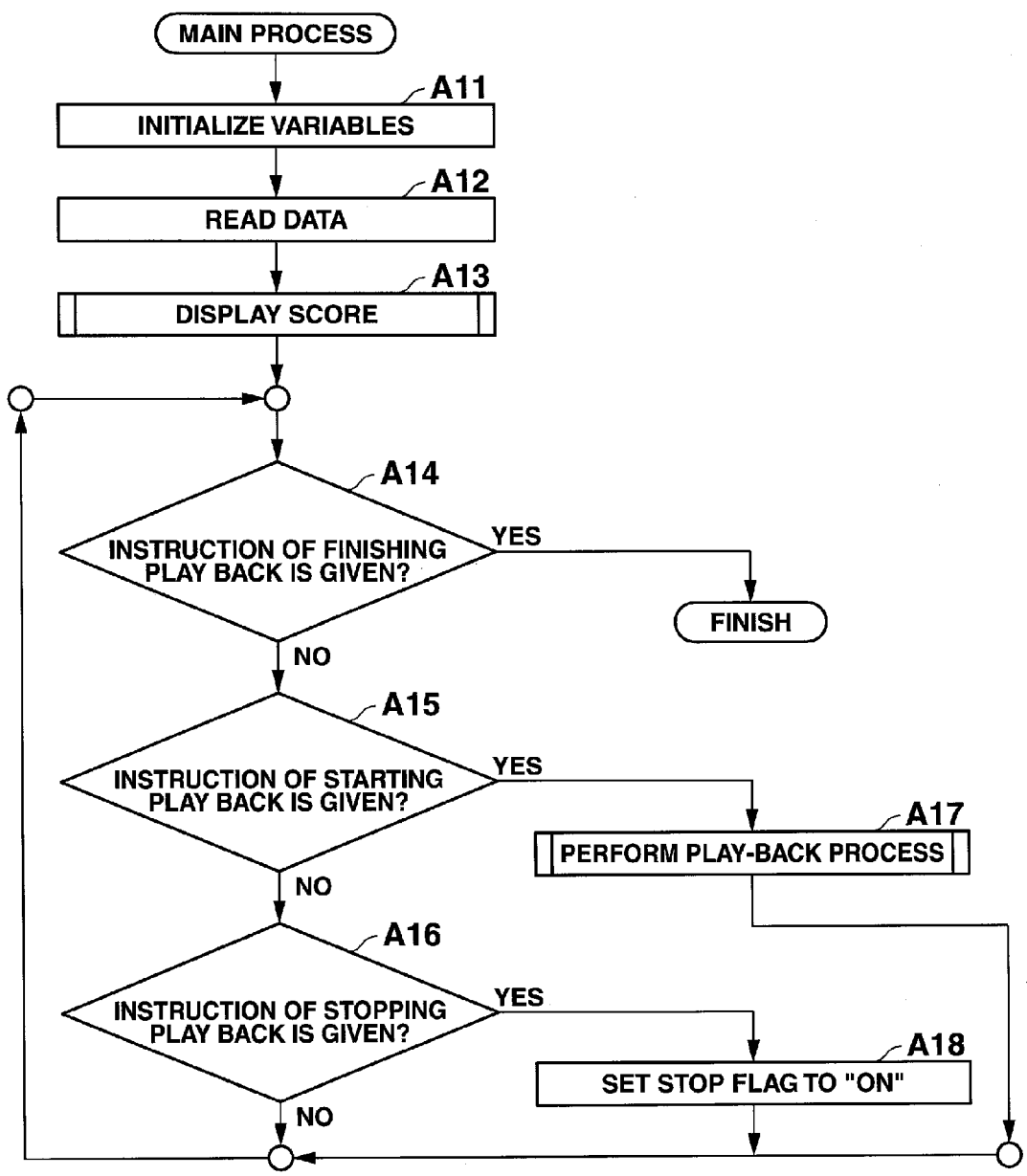
FIG. 11 is a flow chart of a main process performed by PC (CPU) in the performance system according to the embodiment of the invention.

FIG. 11 is a flow chart of the main process performed by PC 10 (CPU 11) in the present performance system.

When the power is turned on, CPU 11 initializes the various sorts of controlling variables shown in FIG. 3 to FIG. 6 as needed basis (step A11). Then, CPU 11 reads from RAM 12 image data of a musical score which has been selected in a predetermined operation (step A12), and displays the image of the musical score on the displaying screen of the displaying unit 15 (step A13). These processes will be described with reference to a flow chart of FIG. 12 in detail later.

The image of the musical score displayed on the displaying screen at step A13 is shown in FIG. 7. In FIG. 7, only a part of the image of the musical score (six measures) is displayed, but much more measures will be displayed depending on the size of the displaying screen.

When a play-back start button (not shown) provided on the displaying screen is operated and an instruction of starting a play-back operation is given (YES at step A15), CPU 11 performs a play-back process of the music of the score image 30 currently displayed on the displaying screen (step A17). The play-back process will be described with reference to a flow chart of FIG. 14 in detail later.

When a stop button (not shown) provided on the displaying screen is operated and an instruction of stopping the play-back operation is given (YES at step A16), CPU 11 sets a stop flag to ON, stopping the play-back process (step S18). When a finishing button (not shown) provided on the displaying screen is operated and an instruction of finishing the play-back process is given (YES at step A14), CPU 11 finishes the play-back process.

(b) Musical-Score Image Displaying Process

Figure 12:
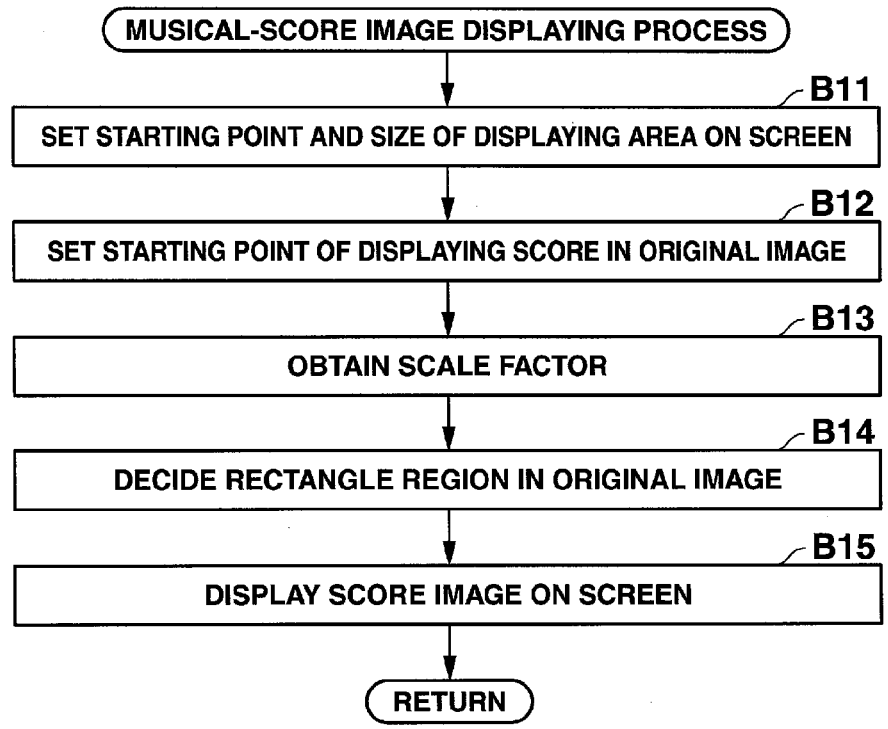
FIG. 12 is a flow chart of a musical-score image displaying process performed at step A13 in FIG. 11.

FIG. 12 is a flow chart of the musical-score image displaying process to be performed at step A13 in FIG. 11.

Figure 13:
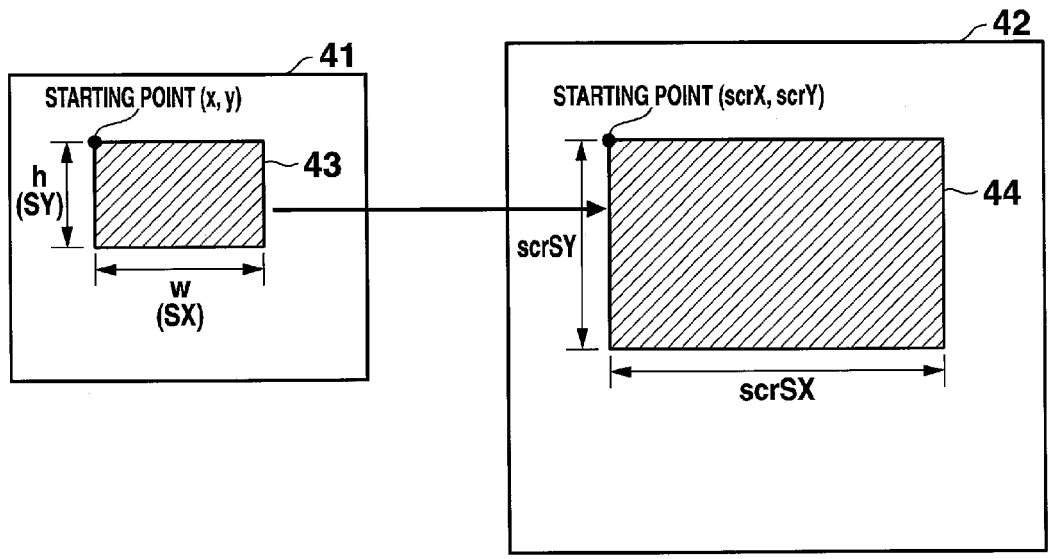
FIG. 13 is a view showing a relationship between an original image of a musical score and a displaying screen in the embodiment of the invention.

Now, it is assumed that a part of the original image 41 used as the musical-score image is displayed on a displaying screen (displaying screen of the displaying unit 15) 42, as shown in FIG. 13. The variables appearing in FIG. 13 are defined in FIG. 3.

CPU 11 sets the coordinates (scrX, scrY) of a starting point of an image displaying area 44 on the displaying screen and length/width sizes (scrSX, scrSY) of the image displaying area 44 (step B11). For example, they are set in accordance with a predetermined musical-score displaying area in the window of an application running on a working personal computer. Further, CPU 11 sets coordinates (x,y) of a starting point of a region 43 for displaying the musical score in the original image 41 (step B12).

More specifically, for example, the coordinates (x, y) of the starting point is set in accordance with the number of page including a predetermined position (the leading position of the first page of music selected by the user and/or apposition designated by the user, etc.) in the musical score selected by the user at step A12 and a position in the musical-score image.

CPU 11 obtains a scale factor of the original image 41 to an displayed image (step B13), and decides a rectangle region for displaying the musical score in the original image 41 in accordance with the scale factor (step B14). Then, CPU 11 expands an image 43 in the rectangle region as the score image 30 on the image displaying area 44 of the displaying screen 42 to display the expanded image 43 (step B15).

More specifically, an image portion of the length/width sizes (scrSX, scrSY) to be displayed, from the coordinates (x,y) of the starting point set in the original image 41 at step B12, converted in scale based on the scale factor set by the user or set in accordance with an application software, as the rectangle area for displaying the score image, and the image portion is expanded and displayed on the image displaying area 44 of the displaying screen 42 upon enlarged or reduced in size depending on the scale factor.

(c) Play-Back Process

Figure 14:
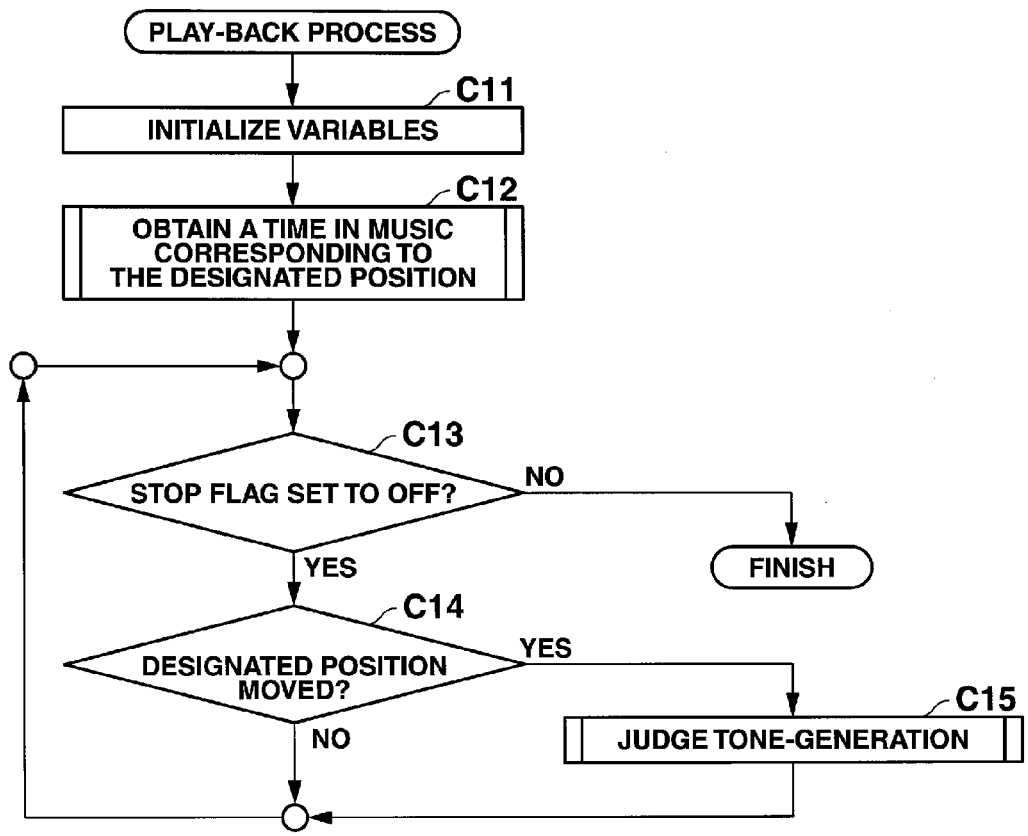
FIG. 14 is a flow chart of a play-back process performed at step A17 in FIG. 11.

FIG. 14 is a flow chart of the play-back process to be performed at step A17 in FIG. 11.

In the play-back process (step A17), a time in music obtaining process (step C12) and a tone-generation judging process (step C15) are performed.

In the time in music obtaining process, when a position on the displaying screen is designated, CPU 11 obtains a position in the displayed image corresponding to the position designated on the displaying screen, and obtains a time in music corresponding to the designated position on the displaying screen from the obtained position in the displayed image (step C12).

In the tone-generation judging process, when the designated position is dragged (or moved) on the displaying screen (YES at step C14), CPU 11 judges a tone-generation based on the dragging operation (the movement) (step C15).

In the play-back process, the various variables are initialized at first (step C11). The tone-generation judging process is performed when the designated position has been moved (YES at step C14) with the stop flag set to OFF (YES at step C13).

Hereinafter, the time obtaining process and the tone-generation judging process will be described in detail.

[Time Obtaining Process]

Figure 15:
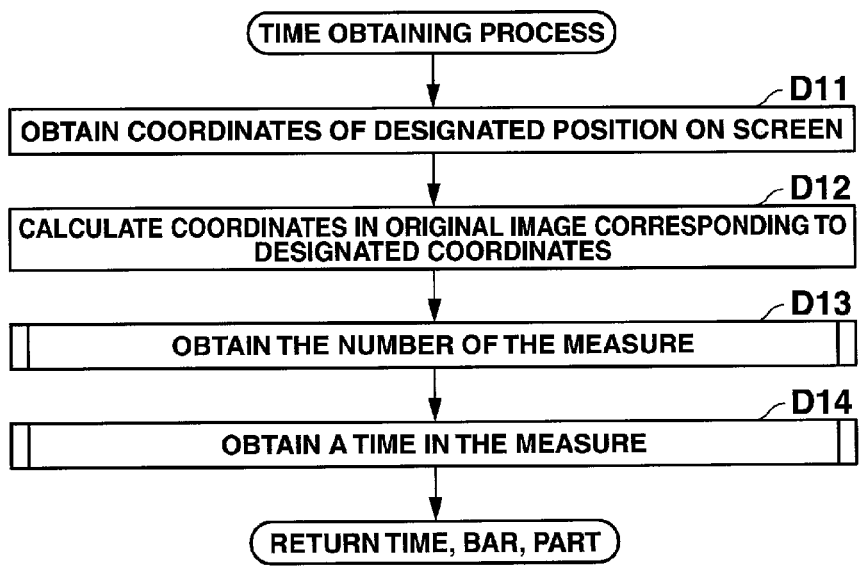
FIG. 15 is a flow chart of a time obtaining process performed at step C12 in FIG. 14.

FIG. 15 is a flow chart of the time obtaining process to be performed at step C12 in FIG. 14.

CPU 11 obtains the coordinates of the position designated on the displaying screen 42 by the user (step D11), and calculates the coordinates in the original image 41 corresponding to the designated position (step D12). More specifically, the coordinates in the original image 41 which corresponds to the designated coordinates on the displaying screen 42 is calculated from the following formulas. xt, yt represent the coordinates designated on the displaying screen 42, and xs, ys represent the designated coordinate in the original image 41 corresponding to the coordinates (xt, yt). The other variables are defined in FIG. 3.

$$xs = scoreCtrl.scrX + (xt - scoreCtrl.scrX)/scoreCtrl.scrSX * scoreCtrl.SX$$

$$ys = scoreCtrl.scrY + (yt - scoreCtrl.scrY)/scoreCtrl.scrSY * scoreCtrl.SY$$

When the coordinate (xs, ys) in the original image 41 corresponding to the designated coordinates (xt, yt) has been obtained, CPU 11 determines a measure designated by the user based on the obtained coordinate (xs, ys), and obtains the number of the measure (step D13).

Figure 16:
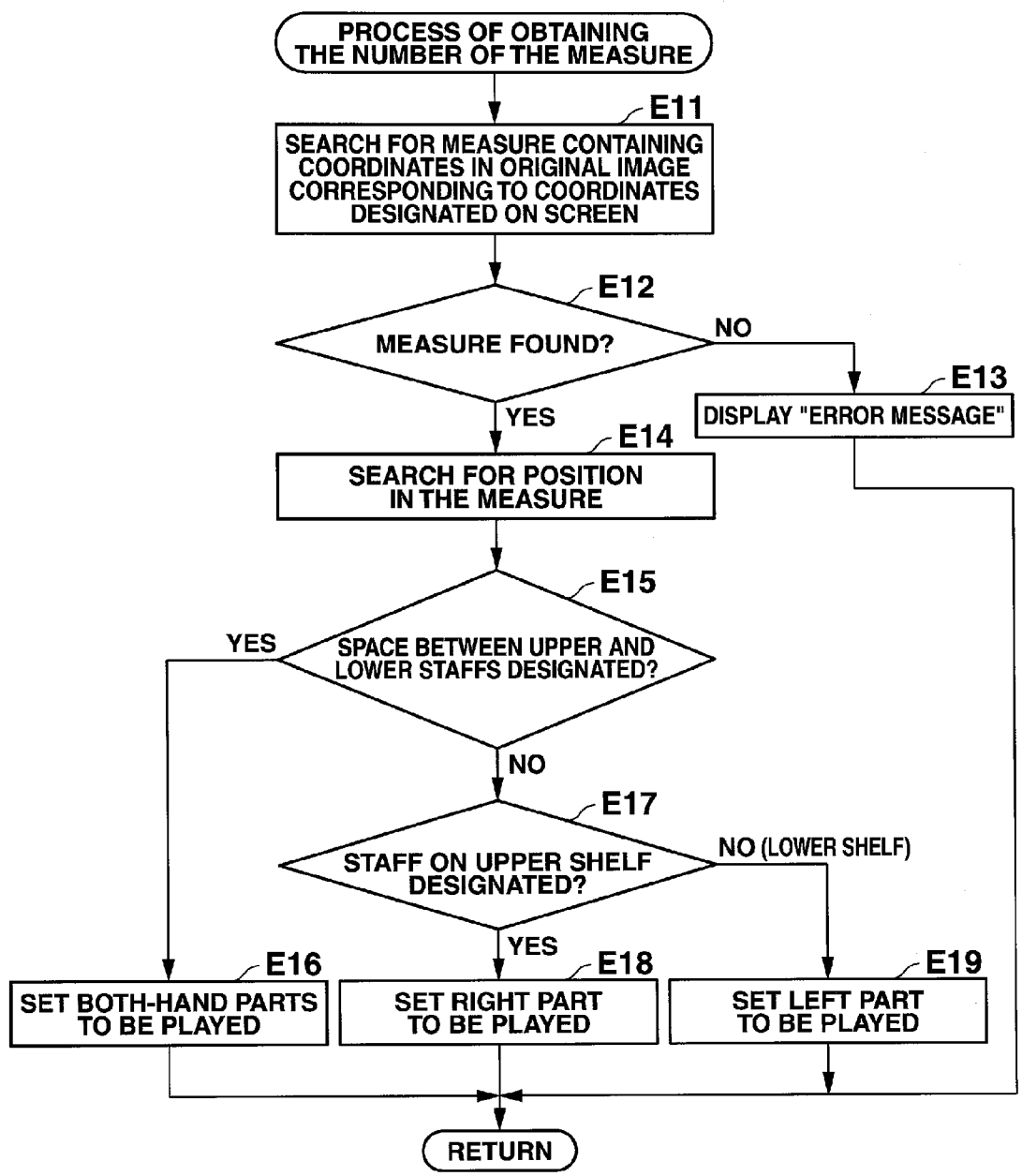
FIG. 16 is a flow chart of a process for obtaining the number of the measure performed at step D13 in FIG. 15.

FIG. 16 is a flow chart of a process for obtaining the number of the measure. In the process of obtaining the number of the measure, CPU 11 searches for a measure containing the designated coordinates (xs, ys) in the original image 41 corresponding to the coordinates (xt, yt) designated on the displaying screen by the user (step E11). More specifically, the number of the measure to be searched for is set to "b" and the number "b" is successively updated from the initial value to search for a rectangle region "Rect" in a measure, which satisfies the following conditions:

$$Meas[b].Rect.Left < xs < Meas[b].Rect.Right$$

$$Meas[b].Rect.Top < ys < Meas[b].Rect.Bottom$$

Figure 17:
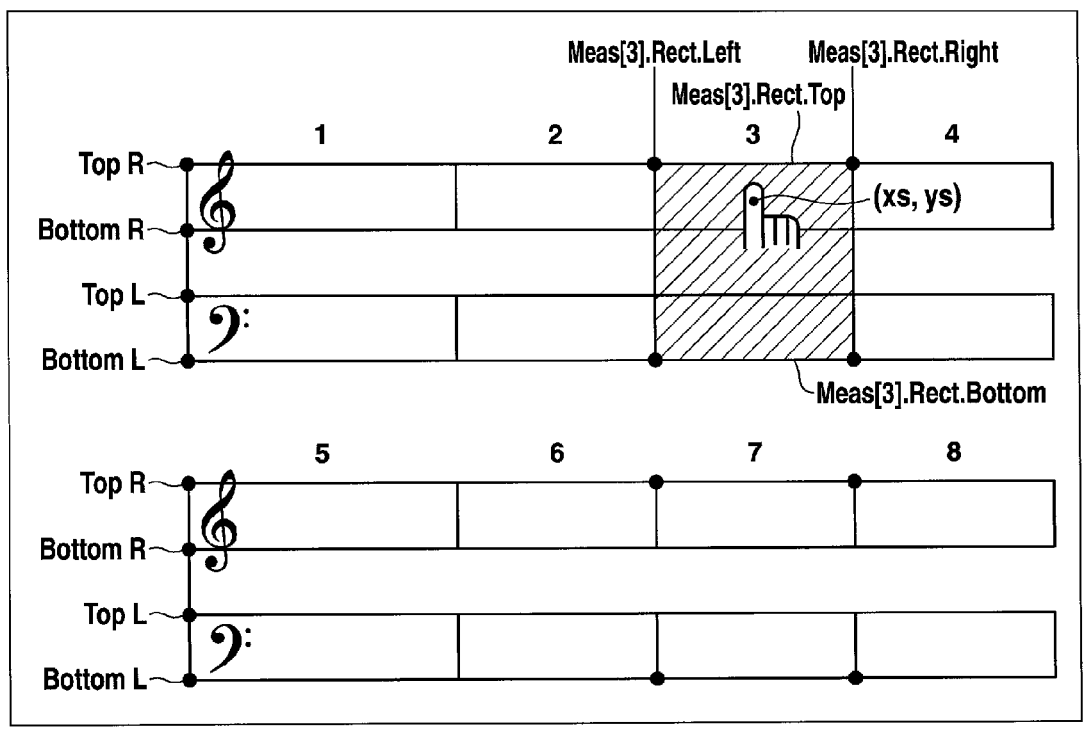
FIG. 17 is a view showing a relationship between a position designated by a user and a region of a measure in the embodiment of the invention.

An example in which the user designates a position in the third measure on the displaying screen is shown in FIG. 17. In the example shown in FIG. 17, the designated coordinates (xs, ys) is within the rectangle region specified by four coordinates:

Meas[3].Rect.Left; Meas[3].Rect.Right; Meas[3].Rect.Top; and

Meas[3].Rect.Bottom, in a measure.

Some musical piece contains musical notes of a higher or lower pitch outside the range of the staff, which notes are placed on or between ledger lines added above or below the staff. In consideration of the positions of these musical notes, it is possible to determine that said measure has been designated, when not only y-coordinate of the fifth line of the staff on the top shelf has been simply set to "Rect.Top" and also y-coordinate of the first line of the staff at the bottom shelf has been simply set to "Rect.Bottom", but also the range containing a given number of ledger lines added above or below the staff has been designated. It is possible to appropriately alter the coordinates of the position of judgment reference in accordance with the musical note of the highest pitch and/or the musical note of the lowest pitch on the score of each shelf in each musical piece.

When an appropriate measure (containing the designated coordinates (xs, ys)) has not been found through the score from the first measure to the last measure (NO at step E12), CPU 11 determines that a position outside the musical-score displaying area on the displaying screen has been designated, and displays an error message such as "Please, designate correctly", waiting for the following instruction (step E13).

When the appropriate measure has been found (YES at step E12), CPU 11 searches for the designated position within the found measure (step E14). More specifically, CPU 11 refers to the following conditions 1 and 2 to locate the designated position in the measure. In the conditions 1 and 2, "ys" is the y-coordinate of the original image 41 corresponding to the designated coordinate by the user.

$$Meas[b].TopR < ys < Meas[b].BottomR \qquad \text{condition 1}$$

$$Meas[b].TopL < ys < Meas[b].BottomL \qquad \text{condition 2}$$

When the designated position satisfies the condition 1, CPU 11 determines that the designated coordinates (xs, ys) is in the staff on the upper shelf within the found measure (YES at step E17), and sets the right part of the measure to be played back (step E18), which is shown in FIG. 9.

When the designated position satisfies the condition 2, CPU 11 determines that the designated coordinates (xs, ys) is in the staff on the lower shelf within the found measure (NO at step E17), and sets the left part of the measure to be played back (step E19), which is shown in FIG. 10.

Meanwhile, when the designated position does not satisfy both the conditions 1 and 2, CPU 11 determines that the designated coordinates (xs, ys) is in a place between the upper staff and the lower staff in the found measure (YES at step E15), and sets the both-hand parts of the measure to be played back (step E16), which is shown in FIG. 8.

Further, CPU 11 performs a process of obtaining a time in a measure in accordance with the coordinates (xs, ys) designated by the user (step D14). The "time in a measure" means a time when a tone is generated at a position in a measure during a performance of a score. The "time in a measure" will be described more specifically. For instance, the tone of the musical note at the first beat in a measure is generated at the same time when a performance of the measure starts, and the tone of the musical note at the second beat will be generated after a duration of the first musical note has lapsed after the beginning of the measure. For instance, when a position between the first and the second beats is designated, an accurate time corresponding to the designated position is calculated in accordance with the designated position. For each musical note on the score, "Time" (a time of starting a tone generation of a musical note) is previously determined as shown in FIG. 6. Using "Time" of each musical note, CPU 11 calculates a time in a measure.

Figure 18:
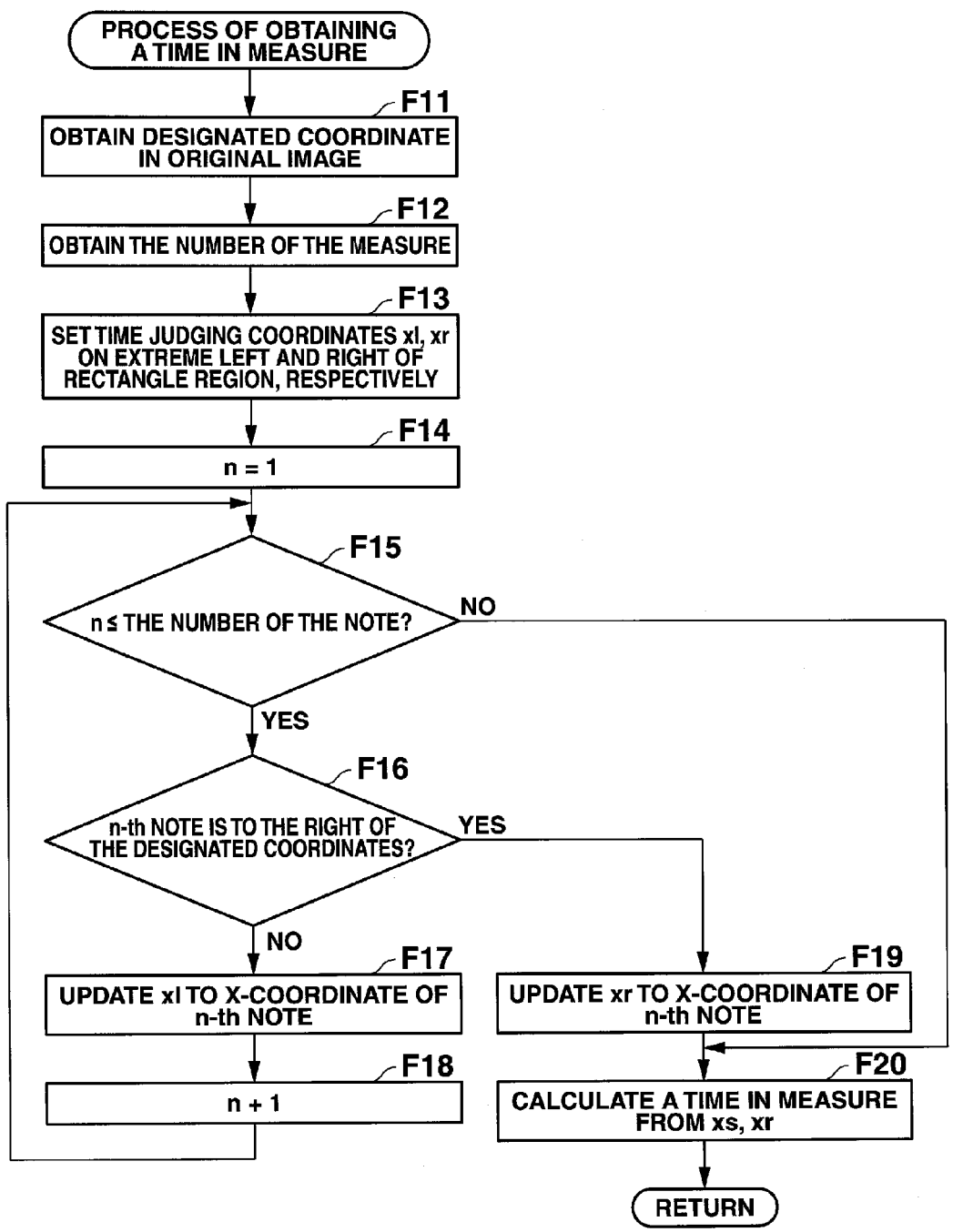
FIG. 18 is a flow chart of a process of obtaining a time in a measure, performed at step D14 in FIG. 15.

FIG. 18 is a flow chart of the process of obtaining a time in a measure to be performed at step D14 in FIG. 15. In the process of obtaining a time in a measure, CPU 11 obtains the designated coordinates (xs, ys) in the original image 41 obtained at step D12 (step F11), and further obtains the number of the measure previously obtained at the step D13 (step F12).

In the measure defined by the number of the measure, CPU 11 sets a time judging coordinate "xl" on the extreme left of the rectangle region in the measure shown in the original image 41 and a time judging coordinate "xr" on the extreme right of the rectangle region in the measure (step F13). Then, CPU 11 sets the number of the musical note to be searched for to "n" and successively updates the value of "n" from its initial value (n=1) (step F14) to obtain a time in the measure in a following manner.

CPU 11 judges whether the n-th musical note lies to the right of the designated coordinates (xs, ys) in the measure (step F16). When the n-th musical note does not lie to the right of the designated coordinates (xs, ys), that is, the n-th musical note lies to the left of the designated coordinates (xs, ys) (NO at step F16), CPU 11 updates the time judging coordinate "xl" on the extreme left to the x-coordinate of the n-th musical note (step F17), and increment "n" (n+1) (step F18). Further, CPU 11 performs the same processes on the following musical note (step F18 to step F15).

Meanwhile, when the n-th musical note lies to the right of the designated coordinates (xs, ys) (YES at step F16), CPU 11 updates the time judging coordinate "xr" on the extreme right to the x-coordinate of the n-th musical note (step F19). Further, using the relationship among the designated coordinate "xs", the time judging coordinates "xl" and "xr", CPU 11 calculates a Time in a measure from the following pro-rate formula (step F20):

$$Time=tl+(tr-tl)*(xs-xl)/(xr-xl)$$

where "tl" is a time corresponding to "xl" and "tr" is a time corresponding to "xr".

Figure 19A:
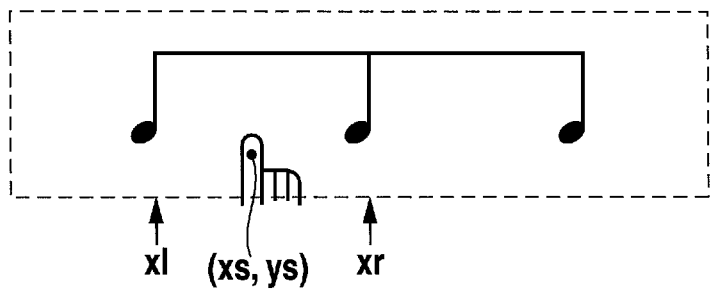
FIG. 19A to FIG. 19C are views each showing a relationship between the designated position and a time in a measure in the embodiment of the invention.
Figure 19B:
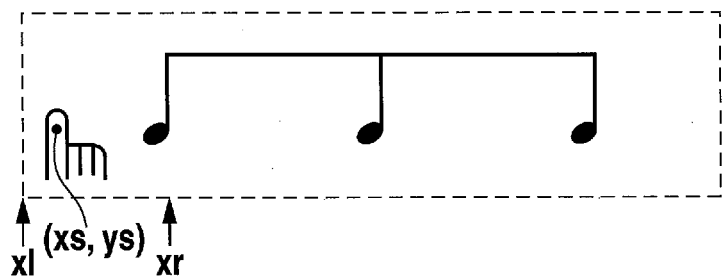
Figure 19C:
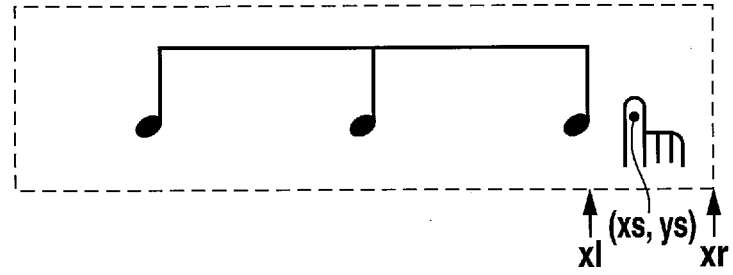

FIG. 19A to FIG. 19C show particular examples. For example, it is assumed that the user designates a space between the first and the second musical notes in the measure, as shown in FIG. 19A. In this case, the time judging coordinate "xl" on the extreme left is updated to the x-coordinate of the first musical note and the time judging coordinate "xr" on the extreme right is updated to the x-coordinate of the second musical note. Therefore, the time "tl" is obtained from the performance information of the first musical note and the time "tr" is obtained from the performance information of the second musical note, and then the Time in a measure can be obtained from the above pro-rate formula.

Meanwhile, it is assumed that the user has designated a space in the vicinity of the extreme left of the measure as shown in FIG. 19B. Since no musical note lies on the left side of the designated coordinates (xs, ys), it is determined YES at the first musical note (step F16). Therefore, the time judging coordinate "xr" on the extreme right is updated to the x-coordinate of the first musical note at step F19. At this time, the time judging coordinate "xl" on the extreme left remains at the extreme left (the beginning of the measure), where said coordinate was set at step F13. In this case, Time in a measure is obtained, for example, with the reference to the musical note in the first measure.

Further, it is assumed that the user has designated a space in the vicinity of the extreme right of the measure as shown in FIG. 19C. In this case, since no musical note lies on the right side of the designated coordinates (xs, ys), it cannot be determined YES at step F16. Therefore, the time judging coordinate "xl" on the extreme left is updated plural times and finally to the x-coordinate of the last musical note. At this time, the time judging coordinate "xr" on the extreme right remains at the extreme right (the end of the measure), where said coordinate was set at step F13. Using the above pro-rate formula in accordance with the designated coordinates (xs, ys) between a tone-generation time "xl" of the last musical note in the measure and the final time of the measure (a beginning time "xr" of the following measure), Time in a measure can be calculated.

[Tone-Generation Judging Process]

The tone-generation judging process will be described in detail.

Figure 20:
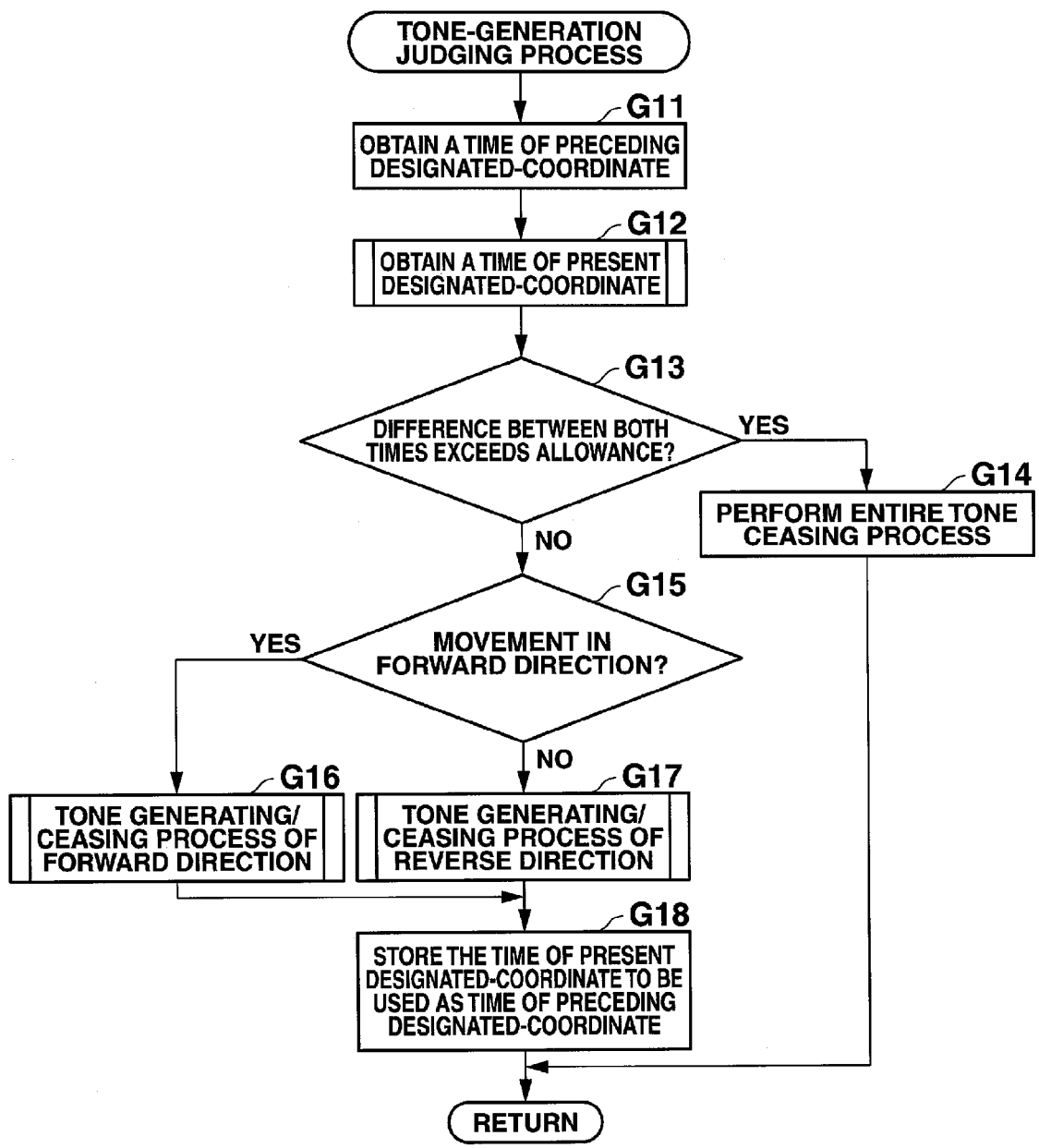
FIG. 20 is a flow chart of a tone-generation judging process performed at step C15 in FIG. 14.

FIG. 20 is a flow chart of the tone-generation judging process to be performed at step C15 in FIG. 14. The tone-generation judging process is performed when the designated coordinates has been moved (YES at step C14).

When the designated coordinates has been moved, CPU 11 obtains a time of the preceding designated-coordinates (step G11) and a time of the present designated-coordinates (step G12), wherein the "time" is the time in a measure. More specifically, the time of the preceding designated-coordinates (step G11) is obtained with reference to the designated coordinates of the first designated position obtained at step C12 or the designated coordinates of the preceding designated position stored at step G18 (to be described later). A time of the present designated coordinates (step G12) is obtained by performing a similar process to the process of FIG. 15 on the moved (or present) designated-coordinates. The process of FIG. 15 will not be described here, again.

When a difference between the time of the preceding designated-coordinates and the time of the present designated-coordinates exceeds an allowance (YES at G13), CPU 11 determined that the movement is impossible, performing an entire tone ceasing process (step G14). The entire tone ceasing process is performed, when the user has designated a position in several measures ahead, designated a position without paying attention to the number of shelves of scores, or designated a position outside the musical-score displaying area. The entire tone ceasing process clears a buffer (not shown) that serves to hold information of musical notes of being played, ceasing the play-back process. Hereinafter, this buffer is referred to as a "sounding buffer" and provided in a given area of RAM 12.

When the difference between the time of the preceding designated-coordinates and the time of the present designated-coordinates is the allowance or less (NO at G13), and the movement is possible, CPU 11 judges whether the movement is in the forward direction (from the left to the right direction) (step G15). When the time of the present designated-coordinates is later than the time of the preceding designated-coordinates, it is determined that the movement is in the forward direction. When the movement is in the forward direction (YES at step G15), CPU 11 performs a tone generating/ceasing process in accordance with the forward direction (step G16). The tone generating/ceasing process in accordance with the forward direction will be described with reference to FIG. 21 in detail.

Meanwhile, when the time of the present designated-coordinates is before the time of the preceding designated-coordinates, it is determined that the movement is in the reverse direction (movement from the right to the left on the score). When the movement is in the reverse direction (NO at step G15), CPU 11 performs a tone generating/ceasing process in accordance with the reverse direction (step G17). The tone generating/ceasing process in accordance with the reverse direction will be described with reference to FIG. 22 in detail.

Before the designated coordinates is moved, CPU 11 records the time of the present designated coordinates in RAM 12 for using the same time as the time of the preceding designated coordinates (step G18).

[Tone Generating/Ceasing Process in Forward Direction]

Figure 21:
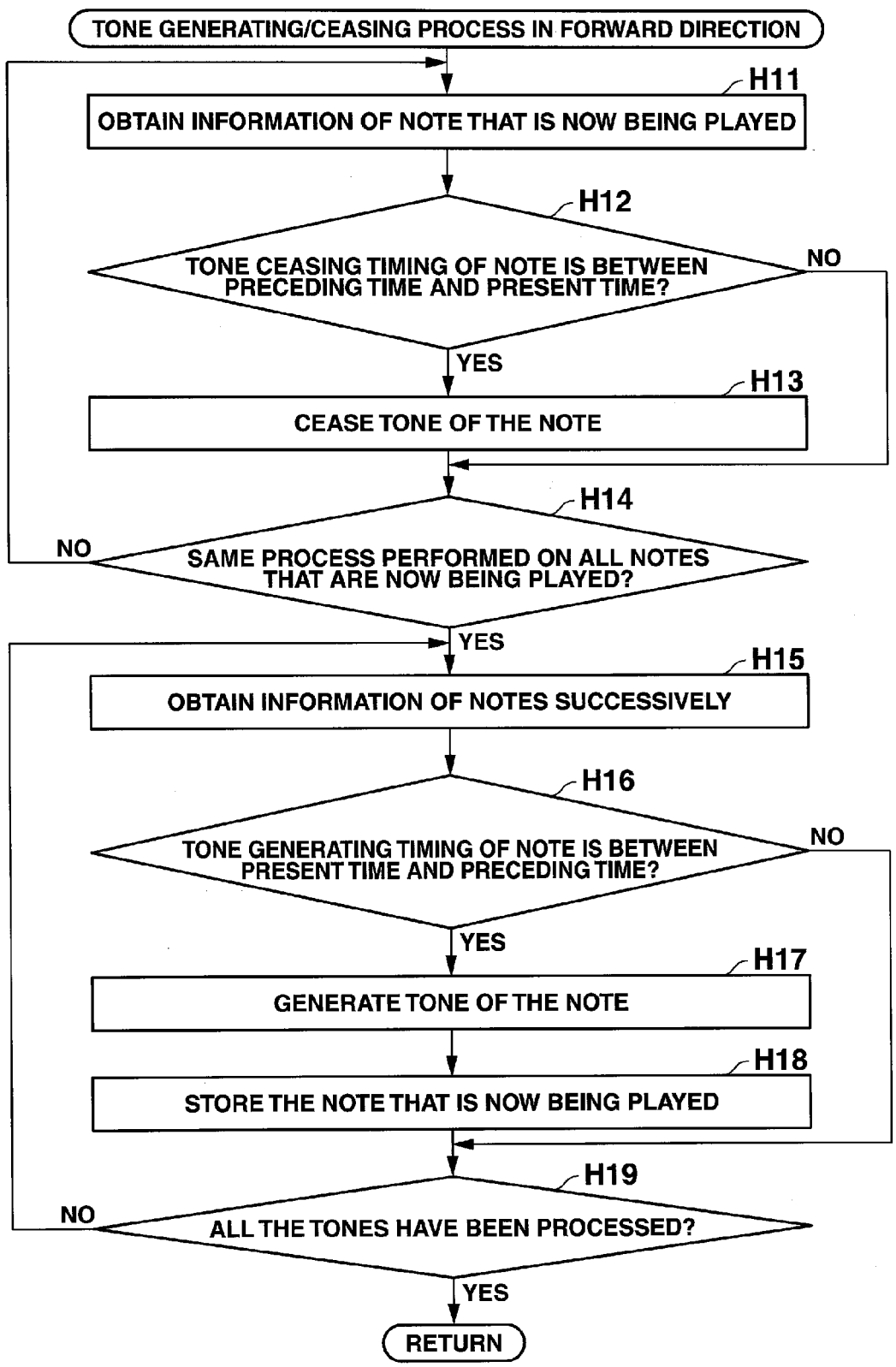
FIG. 21 is a flow chart of a tone generating/ceasing process in the forward direction, performed at step G16 in FIG. 20.

FIG. 21 is a flow chart of the tone generating/ceasing process in the forward direction to be performed at step G16 in FIG. 20.

When the designated coordinates has been moved in the forward direction, CPU 11 refers to the "sounding buffer" to obtain information of the musical note that is now being played (step H11). When a musical note that is now being played is found, CPU 11 judges whether the tone ceasing timing of said musical note is between the time (hereinafter, the "preceding time") of the preceding designated-coordinates and the time (hereinafter, the "present time") of the present designated-coordinates (step H12). In the case of the forward movement, the tone ceasing timing of the musical note is determined by adding a sounding duration of said musical note to the time of starting a tone generation of said musical note.

When the tone ceasing timing of said musical note is between the "preceding time" and the "present time" (YES at step H12), CPU 11 ceases the tone of the musical note, and moves to the next musical note (step H13).

In general, since there is a case where two musical notes or more are played at the same time, such as in the case where a musical note is on each of multiple staffs, and/or in the case of a "double stop" of playing two musical notes simultaneously on the same score, CPU 11 performs substantially the same process on all the musical notes which are now being played, and ceases a tone of a musical note, if any (step H14).

CPU 11 refers to the performance information shown in FIG. 6 to successively obtain information of musical notes (step H15), judging whether the tone generating timing of the musical note is between the "preceding time" and the "present time" (step H16). The "tone generating timing" of the musical note can be obtained from the "time of starting a tone generation of a musical note" contained in the information of musical note.

When the tone generating timing of the musical note is between the "preceding time" and the "present time" (YES at step H16), CPU 11 plays the musical note, that is, generates a tone of the musical note in accordance with the performance information shown in in FIG. 6 (step H17). Further, CPU 11 stores in the "sounding buffer" the musical note which is now being played (step H18).

CPU 11 performs substantially the same process on all the musical notes included in the performance information shown in FIG. 6 to play appropriate musical notes, that is, to generate tones of the appropriate musical notes (step H19). For reduction of a processing time, for instance, it is possible to successively perform the tone-generation process (step H15 to step H19) only on the musical notes that lie between a measure in which the preceding designated coordinates falls and a measure in which the present designated coordinates falls. As a result, musical notes on the musical score, along which a tone-generating position is moved, are played back with the forward movement of the designated coordinates. When the designated coordinates is moved in the forward direction, the displaying positions of the performance pointer 32 shown in FIG. 7 to FIG. 10 are also updated in the forward direction, accordingly.

Figure 23:
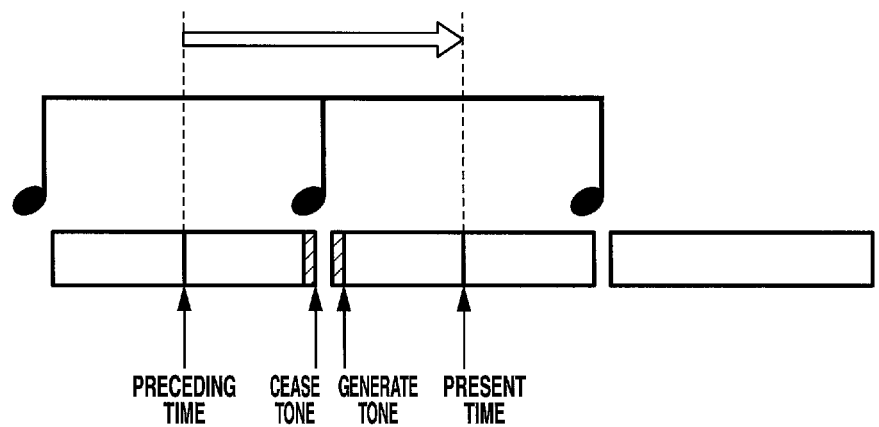
FIG. 23 is a view showing a tone ceasing/generating timing in the forward movement in the embodiment of the invention.

FIG. 23 is a view showing a tone ceasing/generating timing in the forward movement.

In FIG. 23, it is assumed that the first musical note from the left is sounding. If the tone ceasing timing of the musical note falls between the "preceding time" and the "present time", CPU 11 ceases the tone of the first musical note. If the tone generating timing of the second musical note falls between the "preceding time" and the "present time", CPU 11 plays the second musical note, that is, generates a tone of the second musical note.

[Tone Generating/Ceasing Process in Reverse Direction]

Figure 22:
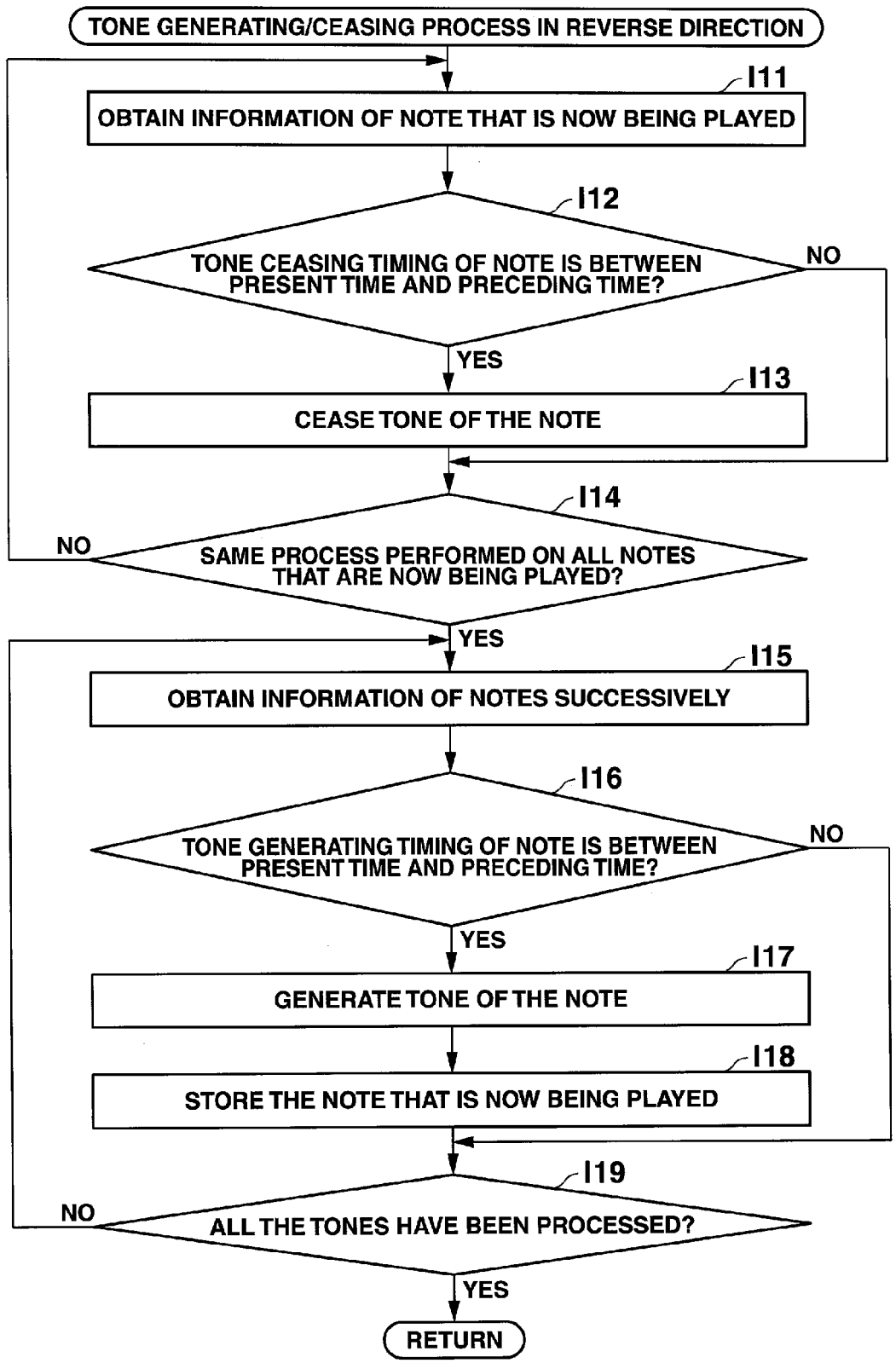
FIG. 22 is a flow chart of a tone generating/ceasing process in the reverse direction, performed at step G17 in FIG. 20.

FIG. 22 is a flow chart of the tone generating/ceasing process in the reverse direction to be performed at step G17 in FIG. 20.

When the designated coordinates has been moved in the reverse direction, CPU 11 refers to the "sounding buffer" to obtain information of the musical note that is now being played (step I11). When a musical note that is now being played is found, CPU 11 judges whether the tone ceasing timing of said musical note is between the time (the "present time") of the present designated-coordinates and the time (the "preceding time") of the preceding designated-coordinates and (step I12). In the case of the reverse movement, the tone ceasing timing of the musical note is determined with reference to the time of starting a tone generation of said musical note.

When the tone ceasing timing of said musical note is between the "present time" and the "preceding time" (YES at step I12), CPU 11 ceases the tone of the musical note, and moves to the next musical note (step I13).

Since there is the case where two musical notes or more are played at the same time, CPU 11 performs substantially the same process on all the musical notes which are now being played, and ceases a tone of a musical note, if any (step I14).

CPU 11 refers to the performance information shown in FIG. 6 to successively obtain information of musical notes (step I15), judging whether the tone generating timing of the musical note is between the "present time" and the "preceding time" (H16). In the case of the reverse movement, the "tone generating timing" of the musical note can be determined by adding a sounding duration of said musical note to the time of starting a tone generation of said musical note.

When the tone generating timing of the musical note is between the "present time" and the "preceding time" (YES at step I16), CPU 11 plays the musical note, that is, generates a tone of the musical note in accordance with the performance information shown in in FIG. 6 (step I17). Further, CPU 11 stores in the "sounding buffer" the musical note which is now being played (step I18).

CPU 11 performs substantially the same process on all the musical notes included in the performance information shown in FIG. 6 to play appropriate musical notes, that is, to generate tones of the appropriate musical notes (step I19). For reduction of a processing time, for instance, it is possible to successively perform the tone-generation process (step I15 to step I19) only on the musical notes that lie between a measure in which the preceding designated coordinates falls and a measure in which the present designated coordinates falls. As a result, musical notes on the musical score, along which a tone-generating position is moved in the reverse direction, are played back in reverse with the reverse movement of the designated coordinates. When the designated coordinates is moved in the reverse direction, the displaying positions of the performance pointer 32 shown in FIG. 7 to FIG. 10 are also updated in the reverse direction, accordingly.

Figure 24:
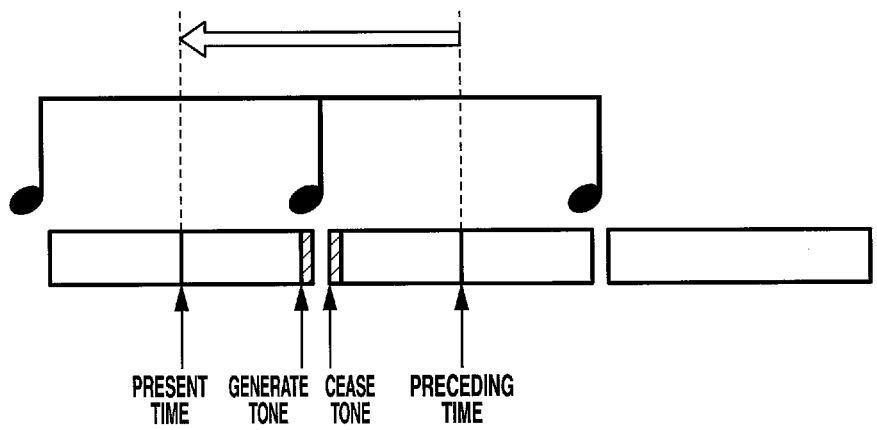
FIG. 24 is a view showing a tone ceasing/generating timing in the reverse movement in the embodiment of the invention.

FIG. 24 is a view showing a tone ceasing/generating timing in the reverse movement.

Now, it is assumed that the second musical note from the left is being played. In the case of reverse movement, the tone ceasing timing of the musical note is determined with reference to the time of starting playing the musical note, that is, the time of starting a tone generation of the musical note. When the tone ceasing timing is between the "present time" and the "preceding time", CPU 11 ceases the tone of the second musical note. Further, in the case of reverse movement, the tone generating timing of the musical note is determined by adding a sounding duration of said musical tone to the time of starting a tone generation of said musical tone. Therefore, when the tone generating timing of the first musical note is between the "preceding time" and the "present time", CPU 11 will generate a tone of the first musical note.

In the embodiment described above, when multiple staffs or staves of a musical score to be played in a piano performance are displayed on the displaying screen, and the user designates a position on the musical score displayed on the displaying screen, CPU 11 selects a part or the whole of the multiple staffs of musical score and plays back musical notes on the selected staffs of musical score.

When the designated position is moved, musical notes can successively be played back with movement of the designated position, allowing the user to easily confirm the performance of music by performing intuitive operation.

When the designated position is moved in the reverse direction, the musical notes can successively be played back in reverse with reverse movement of the designated position. In this case, the musical notes on the musical score are not played back one-by-one but continuously played back in the reverse direction, allowing the user to enjoy a unique music by performing intuitive operation.

In the description of the embodiment, the user designates a position on the displaying screen of a touch panel type, but the user can use a pointing device such as a mouse to designate the position on the displaying screen.

In the embodiment described above, two staffs of musical score to be played in a piano performance, one for the right hand and the other for the left hand, have been described. But the embodiment of the invention can be applied to the multiple staffs of musical score to be played in an orchestra. In this case, when one staff is designated out of the multiple staffs, it is possible to generate tones of the musical notes only on a part of the designated staff, and when a space between staffs is designated, it is possible to generate tones of the musical noted on the entire part.

In the embodiment of the invention, the musical scores are not limited to those on the staffs but may be on a single line representing a rhythm pattern. For instance, when a previously set vertical range is designated, it is possible to determine that the staff falling in the range including the designated position has been designated, and to generate tones of the musical notes on said staff.

In the above described embodiment, CPU 11 reads the image data of a musical score, and displays the image data on the displaying screen. In the present invention can be used musical score data, such as an electronic musical score initially linked with the performance information. Further, MIDI data and WAVE data can be used as the performance information. In this case, MIDI data and/or WAVE data are displayed on the displaying screen, and when a position on the displaying screen is clicked and dragged, an appropriate tracks of MIDI data and/or WAVE data are played back in accordance with tracks dragged on the displaying screen. When a space between the tracks or the upper or lower end is clicked and dragged, it is possible to play back the entire part.

In the above description of the embodiment, the designated position on the displaying screen represented by the user's touching operation on a position on the displaying screen indicates a point having the coordinates (xt, yt). But the designated position can indicate linear portions each having a length or planar portions each having largeness.

In these cases, it can be determined that the musical score to which the longest linear portion belongs has been designated and/or the musical score to which the largest planar portion belongs has been designated. Further, it can be determined that the musical score to which the longest line segment belongs has been designated, among perpendicular line segments passing through the centers of the planar portions.

Although specific embodiments of the present invention have been illustrated in the accompanying drawings and described in the foregoing detailed description, it will be understood that the invention is not limited to the particular embodiments described herein, but numerous rearrangements, modifications, and substitutions can be made to the embodiments described above without departing from the scope of the invention. The following claims are intended to encompass all such modifications.

The methods described in the embodiments of the invention can be written as a computer executable program onto recording media, such as magnetic disks (floppy disks, hard-disk drives, etc.), optical disks (CD-ROMs, DVDs, etc.), and semi-conductor memories. The program written on the recording media is distributed and installed on various devices. Also, the program can be transferred through communication media to various devices. A computer for realizing the present apparatus reads the program from the recording medium, and operates under control of the program to perform the above processes.

What is claimed is:

1. A musical-score performing apparatus comprising:
   a musical-score displaying unit having a displaying screen, which unit displays a musical score of music on the displaying screen, the musical score being represented in a form of multiple staffs including a first staff and a second staff;
   a designating unit which is used to designate a position on the displaying screen of the musical-score displaying unit; and
   a play-back controlling unit which plays back only the music represented by (i) the first staff of the musical score if the position designated by the designating unit is a position on the first staff, (ii) the second staff of the musical score if the position designated by the designating unit is a position on the second staff, and (iii) both of the first staff and the second staff if the position designated by the designating unit is a position in a space between the first staff and the second staff.

2. The musical-score performing apparatus according to claim 1, wherein when the position designated by the designating unit is a position in a space between two staffs from among the multiple staffs of the musical score, the play-back controlling unit selects and plays back the music represented by all of the multiple staffs of the musical score.

3. The musical-score performing apparatus according to claim 1, wherein the play-back controlling unit continuously plays back the music in accordance with movement of the designated position, when the position designated by the designating unit is moved.

4. The musical-score performing apparatus according to claim 1, wherein the play-back controlling unit plays back the music in a reverse direction with movement of the designated position, when the position designated by the designating unit is moved on the musical score in the reverse direction.

5. The musical-score performing apparatus according to claim 4, wherein, when the position designated by the designating unit is moved on the musical score in the reverse direction, (i) the play-back controlling unit generates a tone of a musical note, when the designated position passes by a position corresponding to a timing of ceasing a tone of the musical note during playback in normal time, and (ii) ceases generating the tone of the musical note, when the designated position passes by a position corresponding to a timing of generating the tone of the musical note during the playback in normal time.

6. A musical instrument comprising:
the musical-score performing apparatus according to claim 1; and
a sound-source sounding system that generates a musical tone of the music played back by the play-back controlling unit;
wherein the musical-score displaying unit comprises a displaying screen.

7. A method of performing a musical score, comprising:
displaying a musical score of music on a displaying screen, the musical score being represented in a form of multiple staffs including a first staff and a second staff;
designating a position on the displaying screen; and
playing back only the music represented by (i) the first staff of the musical score if the position designated on the displaying screen is a position on the first staff, (ii) the second staff of the musical score if the position designated on the displaying screen is a position on the second staff, and (iii) both of the first staff and the second staff of the musical score if the position designated on the displaying screen is a position in a space between the first staff and the second staff.

8. A non-transitory computer-readable storage medium with an executable program stored thereon, wherein the program is executable to control a computer to give a performance of music, and when instructed controlled by the program, the computer realizes functions comprising:
a function of displaying a musical score of the music on a displaying screen, the musical score being represented in a form of multiple staffs including a first staff and a second staff;
a function of designating a position on the displaying screen; and
a function of playing back only the music represented by (i) the first staff of the musical score if the position designated on the displaying screen is a position on the first staff, (ii) the second staff of the musical score if the position designated on the displaying screen is a position on the second staff, and (iii) both of the first staff and the second staff of the musical score if the position designated on the displaying screen is a position in a space between the first staff and the second staff.

* * * * *

UNITED STATES PATENT AND TRADEMARK OFFICE
CERTIFICATE OF CORRECTION

| | | |
|---|---|---|
| PATENT NO. | : 9,324,243 B2 | Page 1 of 1 |
| APPLICATION NO. | : 14/223799 | |
| DATED | : April 26, 2016 | |
| INVENTOR(S) | : Junichiro Soejima | |

It is certified that error appears in the above-identified patent and that said Letters Patent is hereby corrected as shown below:

In the Claims

Column 16, line 18, after "when" delete "instructed".

Signed and Sealed this
Second Day of August, 2016

Michelle K. Lee
*Director of the United States Patent and Trademark Office*